(12) United States Patent
Garland

(10) Patent No.: US 6,515,662 B1
(45) Date of Patent: Feb. 4, 2003

(54) COMPUTER APPARATUS FOR PROVIDING STEREOSCOPIC VIEWS FROM MONOGRAPHIC IMAGES AND METHOD

(75) Inventor: Harry B. Garland, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/120,024

(22) Filed: Jul. 16, 1998

(51) Int. Cl.[7] ............................................. G06T 15/20
(52) U.S. Cl. ...................................................... 345/427
(58) Field of Search ......................................... 345/427

(56) References Cited

U.S. PATENT DOCUMENTS

| | | | | |
|---|---|---|---|---|
| 4,870,600 A | * | 9/1989 | Hiraoka ...................... 364/522 |
| 4,962,422 A | * | 10/1990 | Ohtomo et al. ............... 358/88 |
| 5,379,369 A | * | 1/1995 | Komma et al. .............. 395/119 |
| 5,519,485 A | * | 5/1996 | Ohtani et al. ................... 356/2 |
| 5,594,843 A | * | 1/1997 | O'Neill ....................... 395/127 |
| 5,917,539 A | * | 6/1999 | Sorensen et al. ............. 348/56 |
| 5,929,861 A | * | 7/1999 | Small .......................... 345/427 |
| 5,953,013 A | * | 9/1999 | Shimizu ...................... 345/419 |
| 5,953,014 A | * | 9/1999 | Wood .......................... 345/422 |
| 5,973,831 A | * | 10/1999 | Kleinberger et al. ......... 359/465 |
| 6,023,263 A | * | 2/2000 | Wood .......................... 345/139 |
| 6,031,564 A | * | 2/2000 | Ma et al. ....................... 348/43 |
| 6,055,012 A | * | 4/2000 | Haskell et al. ................ 348/48 |

OTHER PUBLICATIONS

"Computer Graphics: Principles and Paractice" by James D. Foley et al., second edition, published by Addison–Wesley 1990, ISBN 0–201–12110–7 at pp. 915–917.*

* cited by examiner

Primary Examiner—Mark Zimmerman
Assistant Examiner—Enrique L Santiago
(74) Attorney, Agent, or Firm—Fitzpatrick, Cella, Harper & Scinto

(57) ABSTRACT

A computer apparatus modifies monographic datamap images into monographic display images in stereoscopic relationship for presentation to a bi-ocular observer such as a person. A stereoscopic (SS) spacing is defined between the left and right virtual viewing points (VVPs) of the observer relative to an initial VVP. A display vertex generator modifies each datamap vertex to generate a corresponding display vertex in the left and right display rasters. The magnitude of the modification is based on the left and right VVPs and on the range coordinate of that datamap vertex. An over-ride feature checks the SS spacing between the left and right display images, and replaces them with a default SS spacing whenever the checked spacing exceeds a predetermined over-ride spacing. A stereoscopic viewing device is responsive to the channels for presenting the display rasters to the left and right eyes of the observer.

31 Claims, 7 Drawing Sheets

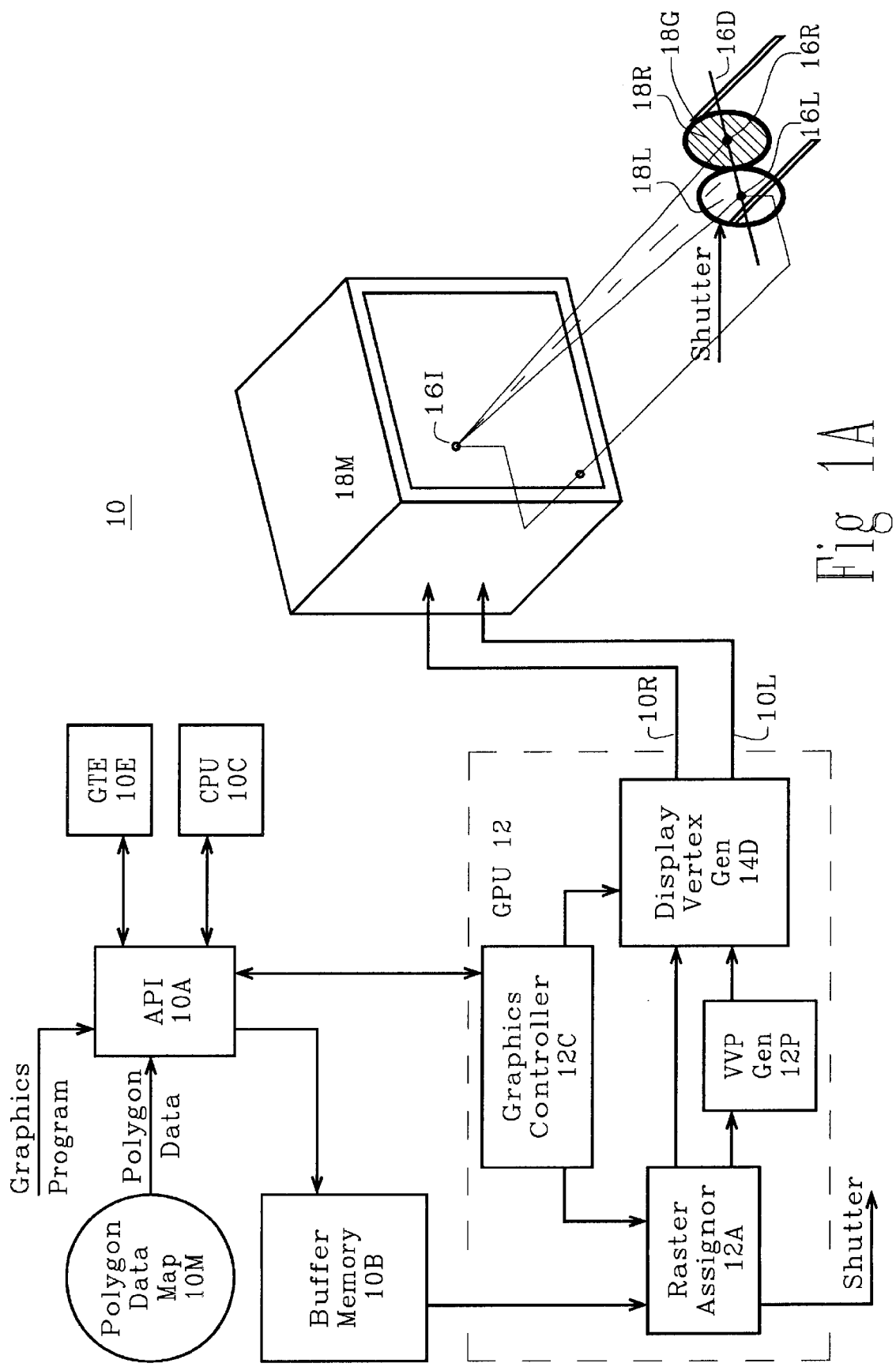

| Polygon Code | # Vertices | Color | -- |
|---|---|---|---|
| Vertex Code | X | Y | Z |
| Vertex Code | X | Y | Z |
| Vertex Code | X | Y | Z |

| INITIAL SOURCE CODE | NEW SOURCE CODE |
|---|---|
| Determine Coordinates of Objects | Determine Coordinates of Objects |
| Clear Ordering Table for GPU | Clear Ordering Table for GPU |
|  | Alternate Stereoscopic Viewing Angle |
| Set Viewing Angle for GPU | Set Viewing Angle for GPU |
| Send Objects to Ordering Table | Send Objects to Ordering Table |
| Wait Till Previous Raster Clears | Wait Till Previous Raster Clears |
| Swap Buffer Raster | Swap Buffer Raster |
| Send Ordering Table to GPU | Send Ordering Table to GPU |
| Swap Buffer Number Between 0-1 | Swap Buffer Number Between 0-1 |
| Fig 6A | Fig 6B |

COMPUTER APPARATUS FOR PROVIDING STEREOSCOPIC VIEWS FROM MONOGRAPHIC IMAGES AND METHOD

TECHNICAL FIELD

This invention relates to providing stereoscopic views based on monographic images from a three dimensional datamap.

BACKGROUND

Heretofore datamaps based on an XYZ coordinate system (3D) have been employed to provide a sequence of monographic images of display objects along X and Y display coordinates (2D). The Z or range coordinate provided a depth dimension effect which supported 3D like features such as:

parallax shift between display objects at different depths;

occulting of distant background objects by closer foreground objects; and keystone taper of objects faces toward a vanishing point. However, these depth effects did not include direct visual range perception between left and right monographic images in stereoscopic relationship.

SUMMARY

It is therefore an object of this invention to provide multiple monographic images in stereoscopic relationship which support direct perception of range.

It is another object of this invention to provide such stereoscopic relationship with controlled stereoscopic spacing for enhancing the range perception.

It is a further object of this invention to provide such stereoscopic relationship by shuttering the monographic images presented to the observer.

It is a further object of this invention to provide such stereoscopic relationship through head mounted monitors which present the monographic images to the observer.

It is a further object of this invention to provide such stereoscopic relationship through head mounted monitors with front and peripheral images in wrap-around relationship.

Briefly, these and other objects of the present invention are accomplished by providing a computer apparatus for modifying monographic datamap images into monographic display images in stereoscopic relationship for presentation to a binocular observer. A buffer memory stores datamap rasters containing monographic datamap images of polygons defined by polygon vertices from a polygon based graphics datamap. Each vertex has a position in a three dimensional coordinate system defined by a traverse coordinate and an elevation coordinate and a range coordinate. A left stereoscopic channel processes datamap rasters stored in the buffer memory forming left display rasters containing left monographic display images at a left virtual viewing point (left VVP), for presentation to the left eye of the observer. A right stereoscopic channel processes datamap rasters stored in the buffer memory forming right display rasters containing right monographic display images at a right virtual viewing point (right VVP) in stereoscopic relationship to the left display images, for presentation to the right eye of the observer. Stereoscopic spacing mechanism defines a stereoscopic spacing between the left and right VVPs. An initial virtual viewing point mechanism defines the position of an initial virtual viewing point (initial VVP) for the datamap raster. A display virtual viewing point mechanism provides the left and right VVPs in stereoscopic relationship based on the position of the initial VVP and on the stereoscopic spacing. A display vertex generator in the left and right channels, modifies each datamap vertex in the datamap raster to generate a corresponding display vertex in the left and right display rasters based on the left and right VVPs and on the range coordinate of that datamap vertex. A stereoscopic viewing device is responsive to the left and right channels for presenting the left and right display rasters containing the left and right display images to the left and right eyes of the observer.

BRIEF DESCRIPTION OF THE DRAWINGS

Further objects and advantages of the present computer apparatus and method, and the operation of the stereoscopic viewing device, will become apparent from the following detailed description and drawings (not drawn to scale) in which:

FIG. 1A is a block diagram of a computer apparatus, a single display monitor, and portable viewing goggles having shuttered viewing windows;

FIGS. 6A and 6B show monographic source code instructions before and after modification.

Figures 1B, 1C:
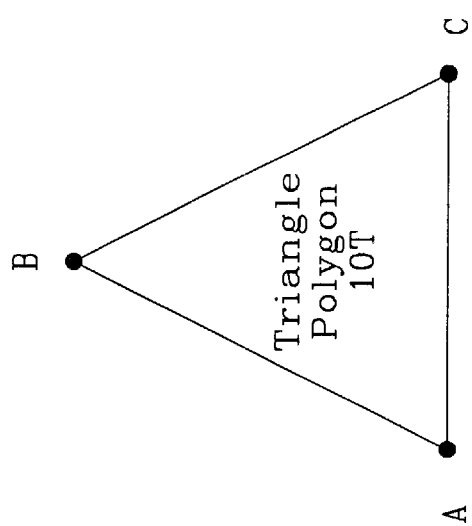
FIG. 1B shows a triangle representing a typical polygon display object processed by the computer apparatus of FIG. 1A.
FIG. 1C shows a code format defining the triangle polygon display object of FIG. 1B.

The first digit of each reference numeral in the above figures indicates the figure in which that element is most prominently shown. The second digit indicates related structural elements, and a final letter (when used) indicates a sub-portion of an element.

REFERENCE NUMERALS IN DRAWINGS

The table below lists all of the reference numerals employed in the figures, and identifies the element designated to by each numeral.

10 Computer Apparatus 10
   10A Application Programming Interface 10A
   10B Buffer Memory 10B
   10C Central Processor Unit 10C
   10E Geometry Engine 10E
   10M Graphics Datamap 10M
   10L First Stereoscopic Channel 10L
   10R Second Stereoscopic Channel 10R
   10T Triangle Polygon 10T
12 Graphics Processor Unit 12
   12A Raster Assignor 12A
   12C Graphics Controller 12C
   12P Display VVP Generator 14D 14D Display Vertex Generator 14D
16D Stereoscopic Display Axis 16D
16I Initial Virtual Viewing Point 16I
16L First Virtual Viewing Point 16L
16R Second Virtual Viewing Point 16R
18G Shuttered Goggles 18G
18M Display Monitor 18M
18L First Viewing Window 18L
18R Second Viewing Window 18R
20L Left Channel 20L
20R Second Channel 20R
22 Graphics Processor Unit 22
   22A Raster Alternator 22A
   22C Graphics Controller 22C
   22L Left Virtual Viewing Point Generator 22L
   22R Right Virtual Viewing Point Generator 22R
   22S Stereoscopic Spacer 22S
24K Keyboard 24K
24L Display Vertex Generator 24L
24R Display Vertex Generator 24R
24S Over-ride Circuit 24S
26D Stereoscopic Display Axis 26D
26L Left Virtual Viewing Point 26L
26R Right Virtual Viewing Point 26R
28M Display Monitor 28M
28P Stationary Viewing Port 28P
28L Left Shuttered Viewing Window 28L
28R Right Shuttered Viewing Window 28R
30B Buffer Memory 30B
30L Left Front Channel 30L
30R Right Front Channel 30R
31L Left Peripheral Channel 31L
31R Right Peripheral Channel 31R
32 Graphics Processor Unit 32
   32D Raster Doubler 32D
   32L Left Front VVP Generator 32L
   32R Right Front VVP Generator 32R
   33L Left Peripheral VVP Generator 33L
   33R Right Peripheral VVP Generator 33R
   34L Left Front Vertex Generator 34L.
   34R Right Front Vertex Generator 34R.
   35L Left Peripheral Vertex Generator 35L.
   35R Right Peripheral Vertex Generator 35R.
   36L Left Virtual Viewing Point 36L
   36R Right Virtual Viewing Point 36R
38L Left Front Monitor 38L
38R Right Front Monitor 38R
39L Left Peripheral Monitor 39L
39R Right Peripheral Monitor 39R GENERAL EMBODIMENT (FIGS. 1A, 1B and 1C)

Computer apparatus 10 (shown in FIG. 1A) modifies monographic datamap images from polygon based graphics datamap 10M into monographic display images in stereoscopic (SS) relationship for presentation to a biocular observer such as a person. Application programming interface (API) 10A receives polygon data from polygon datamap 10M and a graphics program, and interfaces between the codes in the graphics program and the circuits in the computer apparatus. API 10A coordinates the operation of central processor unit (CPU) 10C, geometry engine (GTE) 10E, and graphics controller 12C within graphics processor unit (GPU) 12. Geometry engine GTE 10E receives the polygon vertices from API 10A for calculating the position of each datamap polygon vertex and the geometric relationships between the datamap vertices. Buffer memory 10B stores a datamap raster containing a monographic datamap image of polygon display objects such as triangle 10T (see FIG. 1B) from polygon datamap 10M.

Each vertex of each polygon display object has a position in a datamap three dimensional coordinate system defined by a generally traverse coordinate (relative to the observer), and a generally elevational coordinate (relative to the observer), and a range coordinate (relative to the observer). The coordinate system may be any suitable system having three dimensions such as an XYZ Cartesian coordinate system having an X traverse coordinate and Y elevation coordinate and a Z range coordinate. Alternatively, the coordinate system may be a polar coordinate system having an azimuth angle traverse coordinate and a pitch angle elevation coordinate and a radius range coordinate. The polygon datamap may be any suitable data storage device of sufficient capacity such as a ROM. First stereoscopic channel 10L within graphics processor unit 12 processes a datamap raster stored in buffer memory 10B forming a first display raster containing a first monographic display image at a first virtual viewing point (first VVP) 16L, for presentation to the first eye of the observer. Similarly, second stereoscopic channel 10R processes a datamap raster forming a second display raster containing a second monographic display image at a second virtual viewing point (second VVP) 16R for presentation to the second eye of the observer. Raster assignor 12A assigns the datamap rasters to the respective channels.

Stereoscopic Spacing

A suitable stereoscopic spacing mechanism defines a SS spacing (or angle) between the first and second VVPs. The first and second display images are monographic images, but are presented in left/right SS relationship permitting the observer to mentally resolve the monographic images into a composite stereoscopic view. The first VVP and the second VVP are spaced along stereoscopic display axis 16D which is preferably parallel with the traverse coordinate. The VVPs may be spaced along a horizontal stereoscopic display axis, which is coincident with a horizontal stereoscopic observer axis defined by a left observer viewing point (at the observer's left eye) and a right observer viewing point (at the observer's right eye). A preferred stereoscopic view is obtained when the SS spacing is based on a statistical average or mean human eye spacing, permitting the observer viewing points to generally coincide with the VVPs. In this simple parallel embodiment, display VVP generator 12P provides the VVPs by a shift in the value of X along the traverse coordinate equal to the SS spacing.

The spacing mechanism may be a graphics instruction containing the distance (or angle) of the SS spacing from the graphics program and stored in the buffer memory. The spacing mechanism may be spacer 22S which receives a distance instruction entered through an input device such as keyboard 24K (see FIG. 2), or otherwise introduced by the observer. Increasing the spacing increases the observers stereoscopic range perception. Alternatively, the spacing may be initially defined by a graphics instruction from the buffer memory, which is subject to change by an observer entered instruction.

Virtual Viewing Points

An initial VVP mechanism defines the position of an initial virtual viewing point (initial VVP) 16I for the datamap raster. The initial VVP has an XYZ position in the three dimensional coordinate system of datamap 10M. The initial VVP is typically somewhere behind the display screen of monitor 18M, preferably at the vanishing point of the datamap image as shown in FIG. 1A. First VVP 16L and second VVP 16R also have positions in the three dimensional coordinate system of datamap 10M. These positions are typically directly in front of the monitor at a distance point convenient to the observer as shown in FIG. 1A. Initial VVP 16I may be an instruction stored in the buffer memory like the initial SS spacing. The initial VVP may be dynamic and change in response to joystick maneuvers by the observer (or other input). Alternatively, the initial VVP may be static (fixed at a set viewing point) or programmed (determined by the graphics program). A display VVP mechanism provides the first and second VVPs in SS relationship based on the position of the initial VVP and on the SS spacing. The display VVP mechanism may be in the source code of the graphics program, or may be a suitable hardware circuit such as display VVP generator 12P. In a full shift embodiment (shown in FIG. 1A) first VVP 16L in first channel 10L is initial VVP 16I. Display VVP generator 12P in the second channel shifts the position of the initial VVP the full SS spacing along the stereoscopic axis to generate second VVP 16R in SS relationship with the initial VVP. In a half shift embodiment (shown in FIG. 2) display vertex generator 24L is in left channel 20L, and display vertex generator 24R is in second channel 20R. The two VVP generators shift the initial VVP one half of the SS spacing in the left direction along stereoscopic display axis 26D to generate left VVP 26L, and one half of the spacing in the right direction to generate right VVP 26R. In the simple parallel axis embodiment, the half shifts are simple plus and minus shifts along the X axis. The half shift embodiment maintains a left/right balance of the display image relative to the initial VVP centered therebetween. The balance reduces parallax distortion at near ranges permitting precision close-up viewing.

Display Vertex Generator 14D

The display vertices may be generated by a suitable hardware circuit such as display vertex generator 14D located in the first and second channel. Display vertex generator 14D modifies each datamap vertex in the first datamap raster to generate a corresponding display vertex in the first display raster, based on the first VVP and on the range coordinate of that datamap vertex. Generator 14D similarly modifies each datamap vertex in the second datamap raster to generate a corresponding display vertex in the second display raster based on the second VVP and the range coordinate. The magnitude of the vertex shift is inversely proportional to the range coordinate of the vertex and directly proportional to the SS spacing. The vertex shift approaches zero as the range approaches infinity. The vertex shift at each range for a given spacing may be provided by a look-up table. In the simple parallel embodiment, each vertex shift is an X axis displacement of the X coordinate.

Stereoscopic Viewing Device

A stereoscopic viewing device is responsive to the first channel for presenting the first display raster containing the first display image to the first eye of the observer. The viewing device is similarly responsive to the second channel for presenting the second display raster containing the second display image to the second eye of the observer. The viewing device may be any suitable stereoscopic device such as display monitor 18M with shuttered goggles 18G. The monitor alternately displays the first display image to first viewing window 18L in the goggles, and the second display image to second viewing window 18R. First viewing window 18L may be alternately shuttered between a passing mode and a blocking mode, for passing the first display image to the first eye of the observer and blocking the second display image. Second viewing window 18R may be reverse shuttered for blocking the first display image to the second eye of the observer and passing the second display image. The shuttered viewing windows may be LCDs having a clear orientation (as shown in window 18L) for passing the display images and having an opaque orientation (as shown by cross hatching of window 18R) for blocking the display images. Preferably, the change in LCD orientation is synchronized by SYNC signal to occur during the inter-raster blank period of the monitor.

Figure 2:
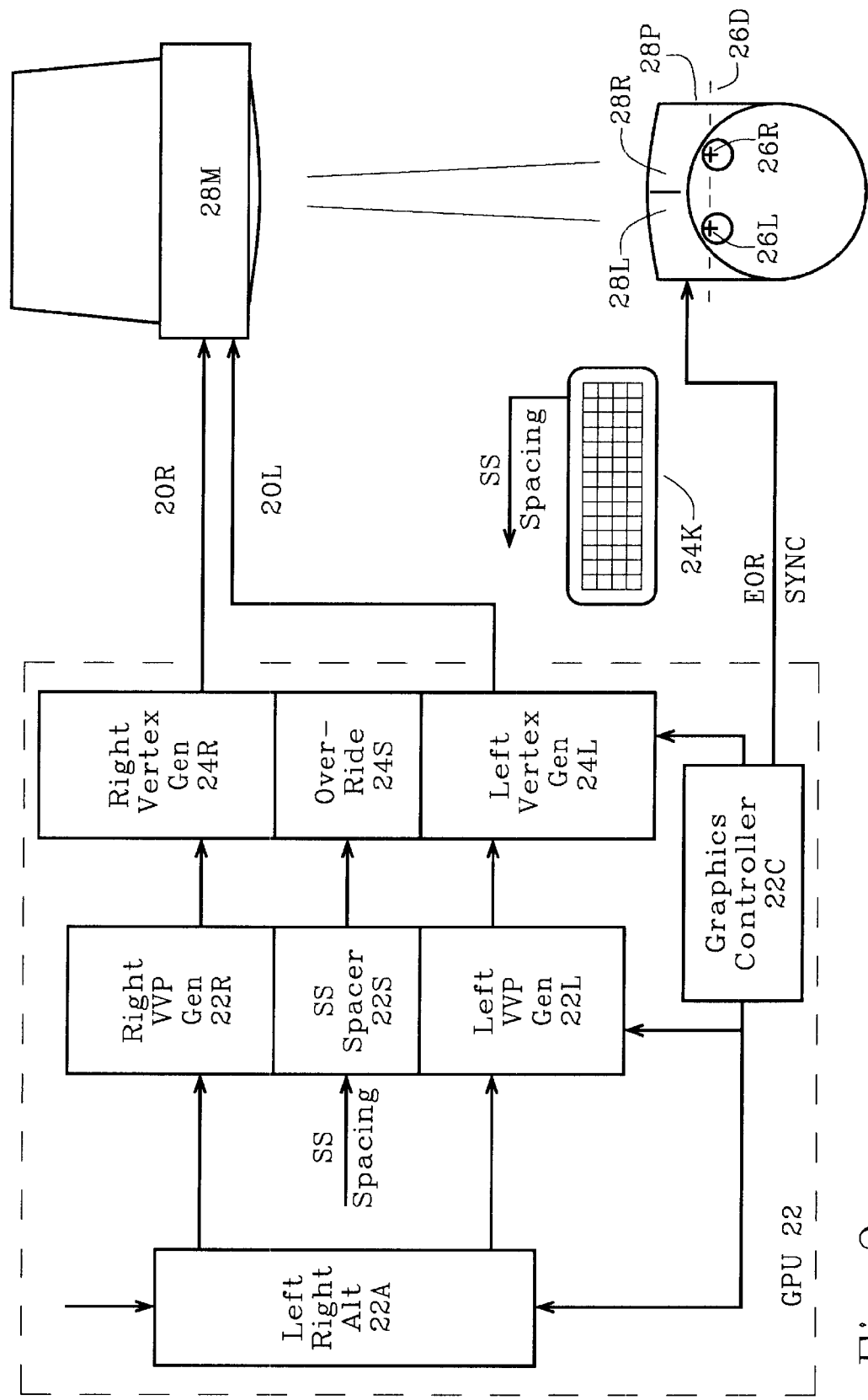
FIG. 2 shows a block diagram of a graphics processor unit, a single monitor, and stationary viewing ports having shuttered viewing windows.

The SYNC signal from the graphics processor unit to the viewing device may be any suitable indicator of raster status such as an EOR SYNC (end-of-raster signal) shown in FIG. 2. In the embodiment of FIG. 1A, the shuttered viewing windows are portable goggles worn by the observer. The SYNC signal is transmitted to the portable goggles by a suitable transmission medium such as infra-red light. In the embodiment of FIG. 2, stationary viewing port 28P has left and right shuttered viewing windows 28L and 28R, preferably positioned at left and right VVPs 26L and 26R. The left and right observer viewing points become fixed at the left and right VVPs as the observer "fits" into stationary viewing port 28P.

Other monographic image techniques may be employed for establish the SS relationship from a single monitor such as red/blue images, polarized images and opticolor glasses. The red/blue technique requires a first color such as red for the first monographic image, and a second color such as blue for the second monographic image. The red and blue images may be presented to the observer simultaneously. The goggles have a red filter lens for one eye and a blue filter lens for the other eye which separate the images. Each eye therefore sees only one monographic image. The polarized technique works on a similar filter basis. The first image is presented to the first eye polarized along a first axis, and the second image is presented to the second eye polarized along a second axis shifted ninety degrees from the first axis. The first and second filters of the goggles are correspondingly polarized to separate the monographic images for the observer. The opticolor glasses technique creates a differential left-right refraction of the colors of a single presented image to establish a SS relationship. The color (red to blue) of each object in the presented image is a function of the range (close to remote) of that object. Longer wavelength light such as red is refracted the most causing the red portion of the image to appear closer. Shorter wavelength light such as blue is refracted the least causing the blue portion of the image to appear farther away. Further details of the opticolor technique are disclosed in U.S. Pat. No. 4,717,239 and U.S. Pat. No. 5,002,364. The subject matter of each patent is hereby incorporated by reference in its entirety into this disclosure.

Polygon Instruction Format

The instruction format for creating triangle polygons 10T is shown in FIG. 1C. The lead instruction starts with a polygon code indicating that this instruction set defines a datamap polygon. The next code in the lead instruction defines the number of vertices N forming the polygon. In the triangle case N=3 (vertex A, vertex B and vertex C). The remaining codes define various visual aspects of the polygon such as color (if any), intensity, transparency, and related display information. The next N instructions are vertex instructions defining the position within the datamap of each of the N vertices. Each vertex instruction starts with a vertex code indicating that this instruction defines a vertex, followed by the X Y and Z coordinates of the position of that vertex within the three dimensional coordinate system of the datamap. The vertices are defined in CW sequence or order by the vertex instructions following the polygon instruction. The three vertex instructions define the three vertices of triangle 10T.

SEQUENTIAL EMBODIMENT (FIG. 2)

In a still embodiment, the images presented to the stereoscopic viewing device may be a single pair of stereoscopic images such as one left image and one right image to present a stereoscopic view of a still scene to the observer. In a sequence embodiment, a buffer memory provides a sequence of datamap rasters to graphics processor unit 22 for presenting an animated image to display monitor 28M. A suitable raster assignor such as raster alternator 22A assigns every other datamap raster from a buffer memory to left virtual viewing point generator 22L in left channel 20L forming a left sequence of display rasters for presentation to the observer's left eye. The alternate every other datamap raster is assigned to right virtual viewing point generator 22R in right channel 20R forming a right sequence of display rasters for presentation to the observer's right eye. The SS spacing is provided to stereoscopic spacer 22S for determining the left virtual viewing point (left VVP) 26L and right virtual viewing point (right VVP) 26R. The display vertex generator in the sequence embodiment has a left generator 24L in the left channel and a right generator 24R in the right channel. Left generator 24L generates display vertices in the left sequence of display rasters. Right generator 24R simultaneously generates display vertices in the right sequence of display rasters. Graphics controller 22C controls the operation of the alternator and generators within GPU 22.

Spacing Over-ride

Stereoscopic spacing over-ride circuit 24S checks the SS spacing between display rasters in SS relationship by comparing the left VVP position with the right VVP position. The over-ride circuit replaces the checked spacing with a default SS spacing whenever the checked spacing exceeds a predetermined spacing. Action displays in video games frequently have rapid changes in view point orientation. For instance, the windshield display for an observer driven vehicle making a hard turn may have severe VVP displacements between sequential display rasters. A turn over a large angle may last for several seconds, causing spacing displacements in 100 or so sequential rasters. These displacements will be temporarily greater than the programmed SS spacing, and may create left/right VVP discontinuities beyond the observer's to resolve into a stereoscopic view. The observer may experience dizziness, nausea, headaches and related trauma associated with simulated motion if these severe displacements are frequent or of long duration. Replacing severe spacing displacements with an acceptable default SS spacing, reduces the motion trauma of hard extended turns.

HEAD MOUNTED EMBODIMENT (FIG. 3)

Figure 3:
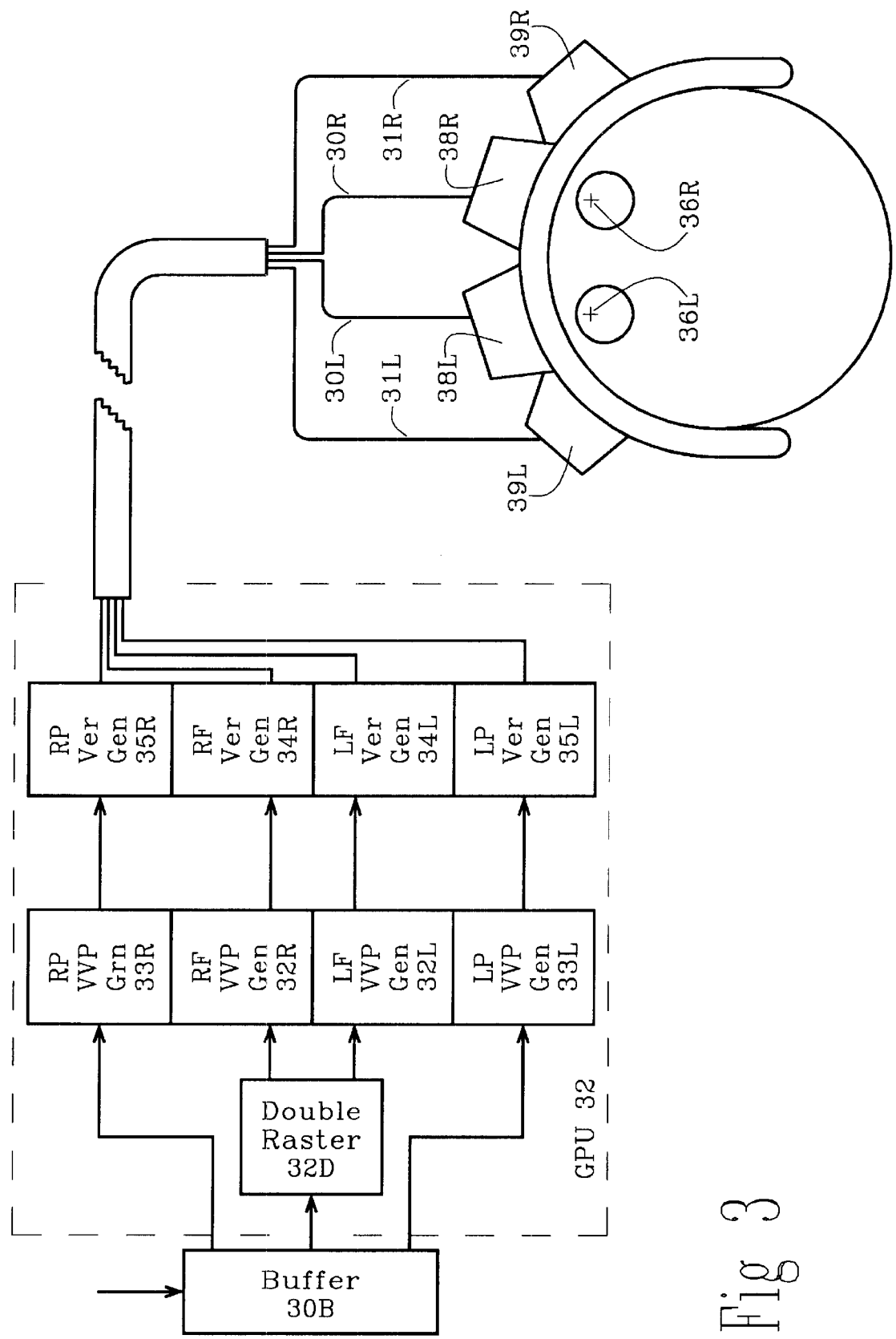
FIG. 3 shows a block diagram of a graphics processor unit, and multiple head mounted monitors displaying front and peripheral views.

The stereoscopic viewing device may be a set of head mounted display monitors such as left front monitor 38L, right front monitor 38R, left peripheral monitor 39L, and right peripheral monitor 39R as shown in FIG. 3. Left front monitor 38L presents a left front monographic display image at left virtual viewing point (left VVP) 36L to the left eye of the observer. Right front monitor 38R presents a right front monographic display image at right virtual viewing point (right VVP) 36R to the right eye of the observer. The left and right front images are visually isolated to maintain the SS relationship permitting direct depth perception. That is, no part of the left image is included in the right image, and vice versa. Left peripheral monitor 39L presents a left peripheral display image to the left periphery of the left eye of the observer, visually merged with the left front image to provide a monolithic wrap-around left image. A seamless interface between the front and peripheral images maybe established by adjustment of the horizontal and vertical position controls of the monitors. Similarly, right peripheral monitor 39R presents a right peripheral display image to the right periphery of the right eye of the observer, visually merged with the right front display image to provide a wrap-around right image. The front and peripheral images forming each wrap-around image are not in SS relationship, and do not support direct peripheral depth perception.

Each monitor has a corresponding channel within graphics processor unit (GPU) 32 for processing the display images. Left front channel 30L processes the left front image through left front VVP generator 32L and left front vertex generator 34L. Right front channel 30R processes the right front image through right front VVP generator 32R and right front vertex generator 34R. Left peripheral channel 31L processes the left peripheral image through left peripheral VVP generator 33L and left peripheral vertex generator 35L. Right peripheral channel 31R processes the right peripheral image through right peripheral VVP generator 33R and right peripheral vertex generator 35R. Shuttered windows are not required in the head mounted embodiment, because each eye has a separate monitor which presents only images for that eye. The left and right images are presented simultaneously on separate monitors. Additional upper and lower images and channels may be employed in a "fly's eye" embodiment to provide more complete peripheral vision.

Raster Doubler 32D

The datamap image contained in the datamap raster forming the left front display raster may be identical to the datamap image contained in the datamap raster forming the right front display raster. The front image contain the same display objects at a slightly displaced position to provide the SS relationship. Raster doubler 32D provides a duplicate raster to left front channel 30L and to right front channel 30R. Raster doubling permits a faster three raster cycle into buffer memory 30B. The three raster cycle has a front raster (which is doubled), a left peripheral raster and a right peripheral raster. The peripheral rasters are not doubled because they lack common display objects.

METHOD OF OPERATION (FIG. 4)

Figure 4:
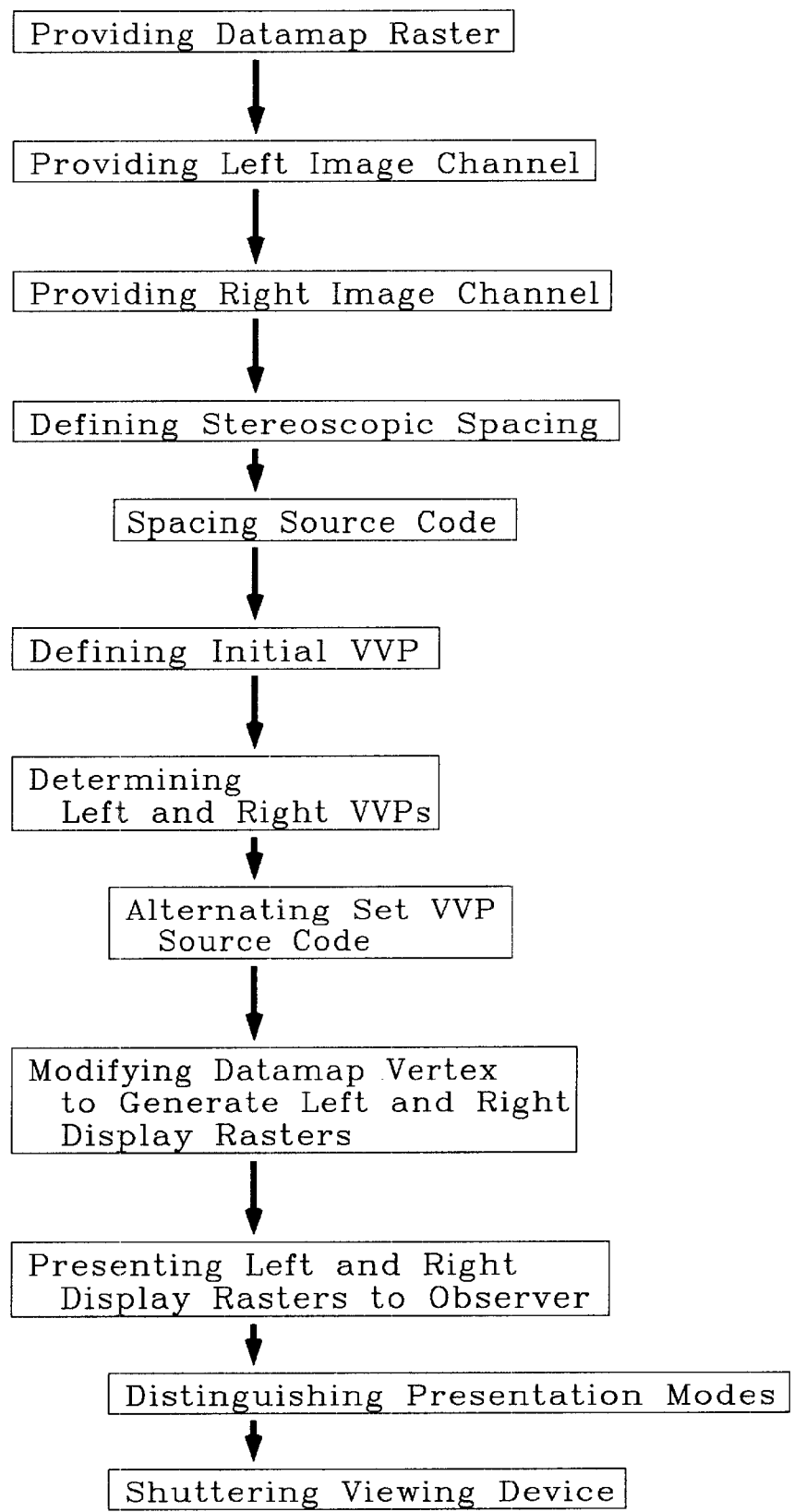
FIG. 4 shows the basic steps and sub-steps of the general method of processing and presenting the stereoscopic views.

In a computer implemented method shown in the flow chart of FIG. 4, a single monographic datamap image is modified into two monographic display images in stereoscopic (SS) relationship for presentation to a biocular observer having a left eye and a right eye. The apparatus required for carrying out the above method of operation is disclosed hereinbefore in connection with FIGS. 1A, 1B, 1C, FIG. 2, and FIG. 3. The method may involve modifying the source code as shown in the source code embodiment disclosed in FIGS. 5 and 6 hereinafter. The basic steps and sub-steps of the general method are described below.

Providing a datamap raster containing a datamap image of polygons defined by polygon vertices from a polygon based graphics datamap. Each vertex has a position in a three dimensional coordinate system defined by a traverse coordinate and an elevation coordinate and a range coordinate.

Providing left image channel for processing the datamap raster forming a left display raster. The left display raster contains a left monographic image at a left virtual viewing point (left VVP) for presentation to the left eye of the observer.

Providing right image channel for processing the datamap raster forming a right display raster. The right display raster contains a right monographic image at a right virtual viewing point (right VVP) for presentation to the right eye of the observer.

Defining a stereoscopic (SS) spacing between the left and right VVPs.

Defining the position of an initial virtual viewing point (initial VVP) for the datamap raster.

Determining the left and right VVPs in SS relationship based on the initial VVP and on the SS spacing.

Modifying each datamap vertex in the datamap raster to generate a corresponding display vertex in the left display raster based on the left VVP and on the range coordinate of that datamap vertex.

Modifying each datamap vertex in the datamap raster to generate a corresponding display vertex in the right display raster based on the right VVP and on the range coordinate of that datamap vertex.

Presenting the left display raster containing the left monographic image to the left eye of the observer in a left presentation mode.

Presenting the right display raster containing the right monographic image to the right eye of the observer in a right presentation mode, which is distinguishable from the left presentation mode. The right monographic image is in SS relationship with the left monographic image.

The step of presenting the display rasters to the observer may include distinguishing the left presentation mode from the right presentation mode through a stereoscopic viewing device.

The step of distinguishing the presentation modes may include shuttering the stereoscopic viewing device for alternately passing and blocking the left and right images. First the shuttering passes the left image in the left presentation mode to the left eye of the observer while blocking the right image in the right presentation mode. Then the shuttering blocks the left image in the left presentation mode while passing the right image in the right presentation mode to the right eye of the observer while.

The computer implemented method may involve a computer readable medium containing a computer program that modifies the single monographic datamap image into the two monographic display images. The step of defining the SS spacing may be an instruction executed within the source code of the computer program. The step of defining the left and right VVPs may be executed within the source code of the computer program by alternating a set VVP instruction. In one embodiment, the set VVP instruction may be modified between the initial VVP and either the left VVP or the right VVP. In which case, one eye of the observer has the initial VVP, and the other eye has the modified VVP. In another embodiment, the set VVP instruction is modified between the left VVP and the right VVP. In this case, the left eye has the left VVP, and the right eye has the right VVP. Neither the initial datamap image nor the initial VVP are presented to the observer.

Figure 5:
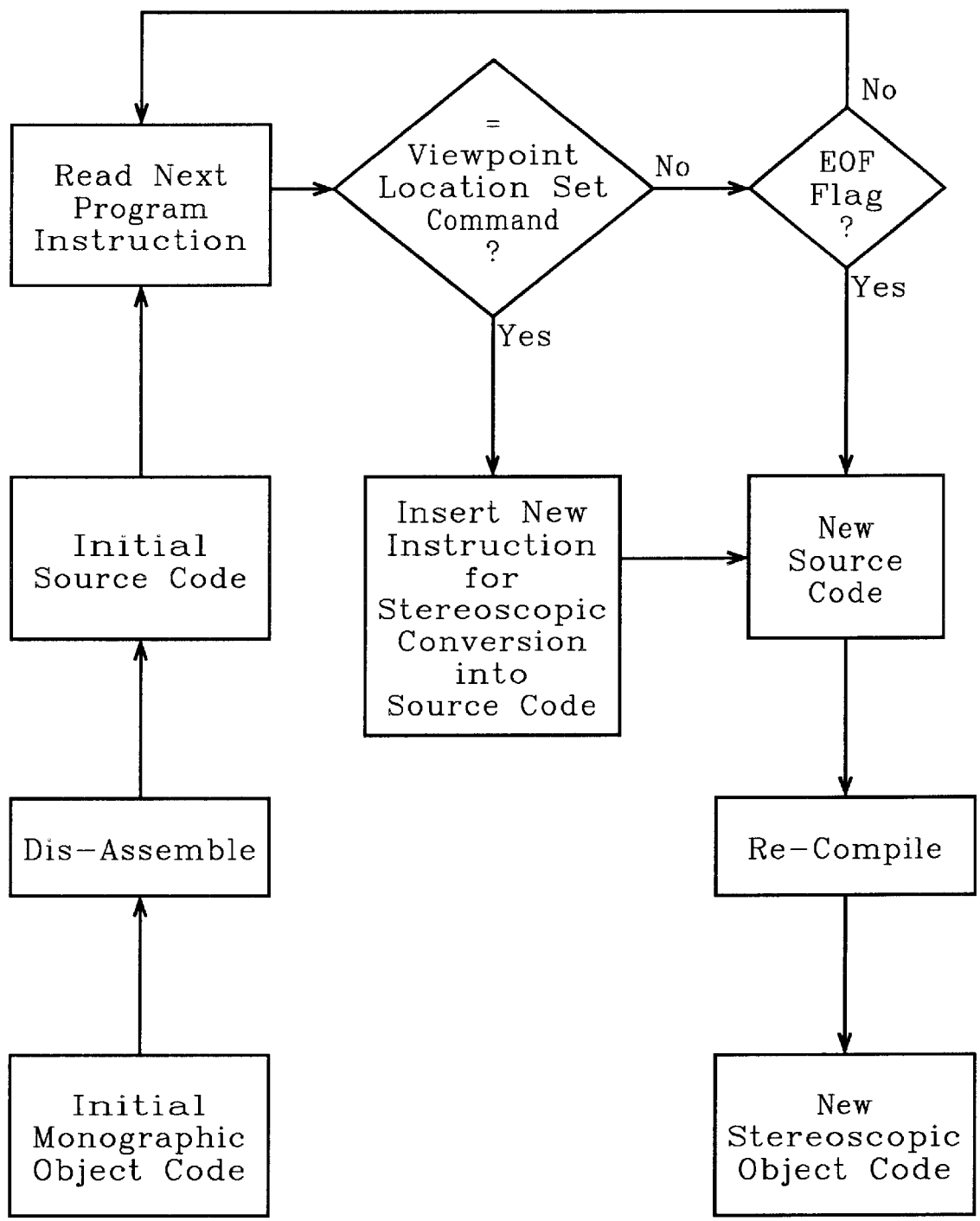
FIG. 5 is a source code flow chart showing the modification of monographic object code into stereoscopic object code.

SOURCE CODE METHOD (FIGS. 5, 6A and 6B)

The general flow chart of FIG. 5 shows the modification of the initial monographic source code (and object code) into new stereoscopic source code (and object code). The initial monographic object code containing the monographic image is dis-assembled into initial monographic source code. The source code is read one instruction at a time. Each instruction is examined for an initial viewpoint location set command. If the instruction contains a VP command (YES), a new instruction is inserted for stereoscopic conversion into new source code. The new stereoscopic source code is recompiled to stereoscopic object code for use in computer apparatus figures. If the instruction does not contain a VP command (NO), the instruction is examined for an EOF (end-of-file) flag, and processed as required. The resulting change in the source code is shown in FIGS. 6A and 6B. The initial source code listing (FIG. 6A) contains codes required to generate monographic display rasters at a single viewing angle. The new source code listing (FIG. 6B) shows an added code for alternating the viewing angles to provide alternate display rasters in stereoscopic relationship.

INDUSTRIAL APPLICABILITY

It will be apparent to those skilled in the art that the objects of this invention have been achieved by providing multiple monographic images in stereoscopic relationship which support direct perception of range. The stereoscopic spacing of the stereoscopic relationship is controlled by program or observer inputs for enhancing the range perception. In some embodiments, left/right shuttering of the monographic images is provided to isolate the left and right images for the observer. In another embodiment, head mounted monitors present the monographic images to the observer, fixing the left and right VVPs relative to the left and right eyes of the observer. The head mounted monitors also provide front images and peripheral images in wraparound relationship for promoting the observer's sense of immersion into the image.

CONCLUSION

Clearly various changes may be made in the structure and embodiments shown herein without departing from the concept of the invention. For example, both still images and sequential images may be employed in the portable embodiment, the stationary embodiment, and the head mounded embodiment. Further, features of the embodiments shown in the various figures may be employed with the embodiments of the other figures.

Therefore, the scope of the invention is to be determined by the terminology of the following claims and the legal equivalents thereof.

What is claimed is:

1. Computer apparatus for modifying monographic datamap images into monographic display images in stereoscopic (SS) relationship for presentation to a bi-ocular observer having a first eye and a second eye, comprising:

buffer memory means for storing a datamap raster containing a monographic datamap image of polygons defined by polygon vertices from a polygon based graphics datamap, in which each vertex has a position in a three dimensional coordinate system defined by a traverse coordinate and an elevation coordinate and a range coordinate;

a first and a second stereoscopic channel for processing the datamap raster stored in the buffer memory means forming a first and a second display raster containing a first and a second monographic display image at a first and a second virtual viewing point (VVP), for presentation to the first and the second eye of the observer;

stereoscopic (SS) spacing means for defining a SS spacing between the first and second VVPs;

initial virtual viewing point means defining the position of an initial virtual viewing point (initial VVP) for the datamap raster;

display virtual viewing point means for providing the first and second VVPs in SS relationship based on the position of the initial VVP and on the SS spacing;

display vertex generator in the first and the second channel, for modifying each datamap vertex in the datamap raster to generate a corresponding display vertex in the first and the second display raster based on the first and the second VVP and on the range coordinate of that datamap vertex;

stereoscopic viewing device responsive to the first channel for presenting the first display raster containing the first display image to the first eye of the observer, and responsive to the second channel for presenting the second display raster containing the second display image to the second eye of the observer; and a stereoscopic spacing over-ride means for checking the SS spacing between the first and second display images in SS relationship by comparing the first VVP position with the second VVP position, and for replacing the checked SS spacing with a default SS spacing whenever the checked spacing exceeds a predetermined spacing.

2. The computer apparatus of claim 1, wherein the initial VVP and the SS spacing are instructions stored in the buffer memory means, and the display virtual viewing point means is a display virtual viewing point generator responsive to these instructions.

3. The computer apparatus of claim 2, wherein:
the first VVP in the first channel is the initial VVP; and the display virtual viewing point generator is in the second channel for modifying the initial VVP of the datamap raster based on the full SS spacing to provide the second VVP in SS relationship with the initial VVP.

4. The computer apparatus of claim 2, wherein the display virtual viewing point generator is in both the first and second channel for modifying the initial VVP of the datamap raster based on one half of the SS spacing to provide the first VVP and the second VVP in SS relationship with the initial VVP.

5. The computer apparatus of claim 1, wherein the SS spacing means is a graphics instruction stored in the buffer memory means defining the SS spacing.

6. The computer apparatus of claim 1, wherein the SS spacing means is an observer entered instruction defining the SS spacing.

7. The computer apparatus of claim 6, wherein the SS spacing means further comprises a graphics instruction stored in the buffer memory means defining an initial SS spacing which may be changed by the observer entered instruction.

8. The computer apparatus of claim 1, wherein the datamap image contained in the datamap raster forming the first display raster is identical to the datamap image contained in the datamap raster forming the second display raster.

9. The computer apparatus of claim 1, wherein the buffer memory means provides a sequence of datamap rasters, and further comprising;

raster assignor for assigning the datamap rasters from the buffer memory means to the first channel forming a first sequence of display rasters for presentation to the observer's first eye, and to the second channel forming a second sequence of display rasters for presentation to the observer's second eye.

10. The computer apparatus of claim 9, wherein the display vertex generator further comprises;
a first display vertex generator in the first channel for generating display vertices in the first sequence of display rasters; and a second display vertex generator in the second channel for simultaneously generating display vertices in the second sequence of display rasters.

11. The computer apparatus of claim 10, wherein the raster assignor is a raster alternator for assigning every other datamap raster to the first channel, and for assigning the alternate every other datamap raster to the second channel.

12. The computer apparatus of claim 1, wherein the three dimensional coordinate system is an XYZ Cartesian coordinate system having an X traverse coordinate and a Y elevation coordinate and a Z range coordinate.

13. The computer apparatus of claim 1, wherein the three dimensional coordinate system is a polar coordinate system having an azimuth angle traverse coordinate and a pitch angle elevation coordinate and a radius range coordinate.

14. The computer apparatus of claim 1, wherein the first VVP and the second VVP are spaced along a stereoscopic display axis parallel with the traverse coordinate, and the display virtual viewing point means provides the first and second VVPs by shifting the value of the traverse coordinate.

15. The computer apparatus of claim 1, wherein the stereoscopic viewing device comprises:
a monitor for alternately displaying the first display image and the second display image;
a first shuttered LCD viewing window for alternately passing the first display image to the first eye of the observer and blocking the second display image; and
a second shuttered LCD viewing window for alternately passing the second display image to the second eye of the observer and blocking the first display image.

16. The computer apparatus of claim 15, wherein the shuttered LCD viewing windows have a clear orientation for passing the display images and have an opaque orientation for blocking the display images.

17. The computer apparatus of claim 15, wherein the shuttered viewing windows are portable goggles worn by the observer.

18. The computer apparatus of claim 15, wherein the shuttered viewing windows are stationary viewing ports.

19. The computer apparatus of claim 1, wherein the stereoscopic viewing device comprises:
a first head mounted monitor for displaying the first display image to the first eye of the observer visually isolated from the second display image; and
a second head mounted monitor for displaying the second display image to the second eye of the observer visually isolated from the first display image.

20. The computer apparatus of claim 19, wherein
the first stereoscopic channel is a left front stereoscopic channel for presenting a left front monographic display image at the first virtual viewing point (first VVP) to the left eye of the observer; and
the second stereoscopic channel is a right front stereoscopic channel for presenting a right front monographic display image at the second virtual viewing point (second VVP) to the right eye of the observer.

21. The computer apparatus of claim 19, further comprising:
a left peripheral monographic channel for presenting a left peripheral monographic display image to the left eye of the observer forming a monographic wrap-around image with the left front display image; and
a right peripheral monographic channel for presenting a right peripheral monographic display image to the right eye of the observer forming a monographic wrap-around image with the right front display image.

22. The computer apparatus of claim 21, wherein the stereoscopic viewing device comprises:
a left front head mounted monitor for displaying the left front display image to the front of the first eye of the observer visually isolated from the right front display image;

a right front head mounted monitor for displaying the right front display image to the front of the second eye of the observer visually isolated from the left front display image;

a left peripheral head mounted monitor for displaying the left peripheral display image to the left periphery of the first eye of the observer visually merged with the left front display image to provide a wrap-around monographic left image; and a right peripheral head mounted monitor for displaying the right peripheral display image to the right periphery of the second eye of the observer visually merged with the right front display image to provide a wrap-around monographic right image.

23. A computer implemented method of modifying a single monographic datamap image into two monographic display images in stereoscopic (SS) relationship for presentation to a binocular observer having a left eye and a right eye, comprising the steps of:

providing a datamap raster containing a datamap image of polygons defined by polygon vertices from a polygon based graphics datamap, in which each vertex has a position in a three dimensional coordinate system defined by a traverse coordinate and an elevation coordinate and a range coordinate;

providing a left and a right image channel for processing the datamap raster forming a left and a right display raster containing a left and a right monographic image at a left and a right virtual viewing point (VVP) for presentation to the left and the right eye of the observer;

defining a stereoscopic (SS) spacing between the left and right VVPs;

defining the position of an initial virtual viewing point (initial VVP) for the datamap raster;

determining the left and right VVPs in SS relationship based on the initial VVP and on the SS spacing;

modifying each datamap vertex in the datamap raster to generate a corresponding display vertex in the left and the right display raster based on the left and the right VVP and on the range coordinate of that datamap vertex;

checking the spacing between the left and the right display raster in SS relationship by comparing the left VVP position with the right VVP position;

replacing the checked spacing with a default SS spacing whenever the checked spacing exceeds a predetermined over-ride spacing;

presenting the checked left display raster containing the left monographic image to the left eye of the observer; and presenting the checked right display raster containing the right monographic image to the right eye of the observer in SS relationship with the left monographic image.

24. The computer implemented method of claim 23, wherein the left monographic image has a left presentation mode and the right monographic image has a right presentation mode which is distinguishable from the left presentation mode.

25. The computer implemented method of claim 24, wherein the step of presenting the display rasters to the observer further comprises the step of:

distinguishing the left presentation mode from the right presentation mode through a stereoscopic viewing device.

26. The computer implemented method of claim 25, wherein the step of distinguishing the presentation modes further comprises the step of:

shuttering the stereoscopic viewing device for alternately passing the left image in the left presentation mode to the left eye of the observer while blocking the right image in the right presentation mode, and then blocking the left image in the left presentation mode while passing the right image in the right presentation mode to the right eye of the observer while.

27. A computer readable medium containing a computer program that modifies a single monographic datamap image into two monographic display images in stereoscopic (SS) relationship for presentation to a binocular observer having a left eye and a right eye, by directing the computer to execute the steps of:

providing a datamap raster containing a datamap image of polygons defined by polygon vertices from a polygon based graphics datamap, in which each vertex has a position in a three dimensional coordinate system defined by a traverse coordinate and an elevation coordinate and a range coordinate;

providing a left and a right image channel for processing the datamap raster forming a left and a right display raster containing a left and a right monographic image at a left and a right virtual viewing point (VVP) for presentation to the left and the right eye of the observer;

defining a stereoscopic (SS) spacing between the left and right VVPs;

defining the position of an initial virtual viewing point (initial VVP) for the datamap raster;

determining the left and right VVPs in SS relationship based on the initial VVP and on the SS spacing;

modifying each datamap vertex in the datamap raster to generate a corresponding display vertex in the left and the right display raster based on the left and the right VVP and on the range coordinate of that datamap vertex;

checking the spacing between the left and right display rasters in SS relationship by comparing the left VVP position with the right VVP position;

replacing the checked spacing with a default SS spacing whenever the checked spacing exceeds a predetermined over-ride spacing;

presenting the checked left display raster containing the left monographic image to the left eye of the observer; and presenting the checked right display raster containing the right monographic image to the right eye of the observer in SS relationship with the left monographic image.

28. The computer readable medium of claim 27, wherein the step of defining the SS spacing is executed within the source code of the computer program.

29. The computer readable medium of claim 28, wherein the step of defining the left and right VVPs is executed within the source code of the computer program by modifying a set VVP instruction.

30. The computer readable medium of claim 29, wherein the set VVP instruction is modified between the initial VVP and either the left VVP or the right VVP.

31. The computer readable medium of claim 29, wherein the set VVP instruction is modified between the left VVP and the right VVP.

* * * * *

UNITED STATES PATENT AND TRADEMARK OFFICE
CERTIFICATE OF CORRECTION

PATENT NO.    : 6,515,662 B1
DATED         : February 4, 2003
INVENTOR(S)   : Harry B. Garland It is certified that error appears in the above-identified patent and that said Letters Patent is hereby corrected as shown below:

Column 1,
Line 50, "binocular" should read -- bi-ocular --.

Column 2,
Line 67, "14D" should read -- 12P --.

Column 3,
Line 56, "biocular" should read -- bi-ocular --.

Column 4,
Line 55, "observers" should read -- observer's --.

Column 6,
Line 24, "establish" should read -- establishing --.

Column 8,
Line 5, "maybe" should read -- may be --;
Line 36, "contain" should read -- contains --; and
Line 49, "biocular" should read -- bi-ocular --.

Column 9,
Line 40, "while" should be deleted.

Column 10,
Line 35, "mounded" should read -- mounted --.

Column 13,
Line 18, "binocular" should read -- bi-ocular --.

UNITED STATES PATENT AND TRADEMARK OFFICE
CERTIFICATE OF CORRECTION

PATENT NO. : 6,515,662 B1
DATED : February 4, 2003
INVENTOR(S) : Harry B. Garland It is certified that error appears in the above-identified patent and that said Letters Patent is hereby corrected as shown below:

Column 14,
Line 10, "while" should be deleted; and
Line 13, "binocular" should read -- bi-ocular --.

Signed and Sealed this

Fourth Day of November, 2003

JAMES E. ROGAN
*Director of the United States Patent and Trademark Office*